United States Patent Office 3,442,744
Patented May 6, 1969

3,442,744
FORM WRAPPED WITH CELLULOSE ACETATE STRIP MATERIAL AND METHOD OF WRAPPING SAID MATERIAL
Robert M. Teter, Jr., John W. Addleburg, and Benjamin P. Rouse, Jr., all of P.O. Box 511, Kingsport, Tenn. 37662, and Charles D. Snead, 1000 Connecticut Ave. NW., Washington, D.C. 20036
No Drawing. Filed Dec. 11, 1967, Ser. No. 689,306
Int. Cl. B32b 23/20; B65h 81/00
U.S. Cl. 161—269          10 Claims

ABSTRACT OF THE DISCLOSURE

Extruded tape made of cellulose acetate of low acetyl content and commercial viscosity range crazes badly when sprayed with a solvent while under tension. This crazing can be reduced or eliminated during solvent bonding of such tape under tension by adding water to the solvent mixture comprising, for example, a mixture of an ethylene glycol monomethyl ether and methyl ethyl ketone.

---

This invention relates to solvent bonding of thermoplastic articles and more particularly to solvent bonding of thermoplastic strip material, such as tapes and tubes, while the material is being held under tension.

In forming useful articles from strips of thermoplastic materials, it often is desirable to bond the strips to each other for structural or decorative purposes. The bonding may be accomplished by the application of an adhesive material and/or solvents to the surfaces to be bonded and the surfaces then are brought together and held under pressure to achieve a bond. The satisfactory bonding of cellulose acetate strip material to each other is difficult in that the material once having the surfaces thereof modified, as by solvents, must be held immobile until bonding is effected or warpage, bubbles, crazing, etc. will result.

Usually strip material of cellulose acetate, when used to form articles, is wrapped under tension about a mandrel of the desired shape. The strip material as it is wound onto the mandrel is usually under some tension and the contacting surfaces are coated, as by spraying, just before they are brought into contact with each other. However, the cellulose acetate is somewhat stiff and springy and when placed under tension in wrapping in some cases tends to fail under the combined influence of tension and solvent thereby resulting in visible defects in the finished article. These defects are normally referred to as crazing.

The problem of crazing is particularly acute when the cellulose acetate material contains from about 36 to 38 percent acetyl and has a falling ball viscosity of from about one-half second to about two-hundred seconds. Cellulose acetate tapes extruded from esters having these characteristics have been found to be especially adapted to be wrapped under tension about small tubular members and to be solvent bonded to form a unitary protective shell about the tubular member. One example of such use is the wrapping of rocket motor double base propellant grains. A second use is where tubular lengths of the cellulose acetate are wrapped around a shaped mandrel to form useful and decorative articles such as lamp shades and flower pots. The applications described above are merely illustrative of products requiring strength and/or aesthetic properties.

We have found that we can substantially reduce and in many cases completely eliminate crazing in the finished product. This totally unexpected reduction of crazing is effected by adding from about 8 percent to about 40 percent by volume of water to solvents for cellulose acetate having an acetyl content of about 36 to 38 percent by weight and using this mixture of water and solvent to coat the surfaces of the tape for bonding purposes.

Preferred solvents for cellulose acetate for use with our invention are ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, methyl acetate, ethyl acetate, ethyl lactate, ethylene glycol monomethyl ether acetate, ethylene glycol monoethyl ether acetate, acetone, methyl ethyl ketone, methyl n-propyl ketone, diacetone alcohol, nitropropane. The solvents all attack the surface of cellulose acetate tapes, as characterized earlier herein, sufficiently to cause bonding as the solvent evaporates and the acetate again solidifies.

It is preferred to use mixtures of solvents, having added thereto from about 8 to about 40 percent water. Some examples of useful mixtures of solvents are ethylene glycol monomethyl ether and methyl ethyl ketone in a 2:1 mixture; ethylene glycol monobutyl ether and methyl ethyl ketone in a 1:1 mixture; and nitropropane and methyl ethyl ketone in a 1:1 mixture. Of course, any desired combination of water miscible or immiscible solvents for cellulose acetate having an acetyl content of about 36 to 38 percent can be used in accordance with our invention. Also, other additives, diluents, inhibitors or like may also be used in combination with the water-solvent mixture. An example would be isopropanol.

This invention is particularly useful in the solvent bonding of cellulose acetate tape being wound about a mandrel under tension. A preferred method of bonding the tapes is one in which a two-inch tape is fed from a roll and is wound onto the mandrel under dead weight tension varying from about 10 to about 50 pounds. A mixture of solvents such as ethylene glycol monomethyl ether and methyl ethyl ketone mixed in a 2:1 ratio plus from 8 to 40 percent water is sprayed onto the tape in an amount sufficient to completely coat the surfaces to be bonded. The tension of course is maintained until the wrapped tape is dry. Usually the solvent-water mixture is heated to about 140° F. before it is applied to the tape. The amount of water, within the range of 8 to 40 percent, necessary to reduce or eliminate crazing of the tape depends upon the amount of tension being applied to the tape. For example, if the solvent is ethylene glycol monomethyl ether and methyl ethyl ketone mixed in a 2:1 ratio, we have found the optimum amount of water in the solvent to be about 10% at ten pounds tension; about 20% at 25 pounds tension; and about 30% at 50 pounds tension. We also have found that the use of less than 8 percent water in the solvent will result in very little effect on the crazing while more than about 40% water will result in deterioration of adhesion of one tape surface to the other.

This invention will be further illustrated by the following examples of preferred embodiments, although it will be understood that these examples are included merely for purposes of illustration and are not intended to limit the scope of the invention.

Examples I, II and III

The solvent bonding mixture is prepared by adding water to a 2:1 (by volume) ethylene glycol monomethyl ether: methyl ethyl ketone mixture. The amount of water used is 10%, 20% and 30% for tension of 10, 25 and 50 pounds, respectively. The solvents are heated to 140° F. and sprayed onto the surfaces of cellulose acetate tape having an acetyl content of about 37%, the tape being two inches wide and 0.0075 inch thick. The wet tape is wrapped around a three-inch diameter mandrel under tensions of 10, 25 and 50 pounds. The table below sets forth the results of the mixtures used:

TABLE I

| Tension, lbs. deadweight | First evidence of reduced crazing, percent $H_2O$ | Elimination of crazing, percent $H_2O$ | Beginning of deterioration of adhesion, percent $H_2O$ |
|---|---|---|---|
| 10 | 8 | 10 | 40 |
| 25 | 15 | 20 | 40 |
| 50 | 25 | 30 | 40 |

Examples IV, V and VI

The procedure of Examples I, II and III was repeated at tension of 10 pounds for the following solvents: 1:1 mixture of ethylene glycol monobutyl ether and methyl ethyl ketone, a 2:1 mixture of ethylene glycol monomethyl ether and dimethyl ketone, and a 1:1 mixture of nitropropane and methyl ethyl ketone. In each instance it was found that the addition of 10% water (by volume) completely eliminated crazing of the cellulose acetate tape.

The invention has been described in detail with particular reference to preferred embodiments thereof, but it will be understood that variations and modifications can be effected within the spirit and scope of the invention as described hereinabove and as defined in the appended claims.

We claim:

1. Process for solvent bonding of cellulose acetate strip material surfaces to each other, comprising wrapping said strip material under tension about a form, applying to the strip material a solvent for cellulose acetate having mixed therein about 8 to about 40 percent water, and maintaining said strip material in its tensioned state until bonding is effected.

2. Process of claim 1 wherein said cellulose acetate strip material is cellulose acetate tape having an acetyl content of about 36 to 38 percent by weight and a falling ball viscosity of about one-half second to about two-hundred seconds.

3. Process of claim 1 wherein said solvent-water mixture contains at least two water miscible solvents for said cellulose acetate strip material having an acetyl content of about 36 to 38 percent by weight.

4. Process of claim 1 wherein said solvent mixture comprises ethylene glycol monomethyl ether and methyl ethyl ketone.

5. Process of claim 1 wherein said solvent mixture comprises ethylene glycol monobutyl ether and methyl ethyl ketone.

6. Process of claim 1 wherein said solvent mixture comprises ethylene glycol monomethyl ether and dimethyl ketone.

7. Process of claim 1 wherein said solvent mixture comprises nitropropane and methyl ethyl ketone.

8. Process of claim 1 wherein said solvent is applied to the strip material during wrapping of the strip material about the form.

9. A form wrapped with cellulose acetate strip material according to the process of claim 1.

10. Process for securing cellulose acetate strip material about a solid rocket fuel comprising:
   (a) wrapping said strip material under tension about a formed solid rocket fuel so that surfaces of strip material overlap;
   (b) applying to the overlapping surfaces of the strip material a solvent having mixed therein about 8 to about 40 percent water; and
   (c) maintaining said strip material in its tensioned state until bonding is effected.

References Cited

UNITED STATES PATENTS

| | | | |
|---|---|---|---|
| 1,964,724 | 7/1934 | Dreyfus | 156—307 XR |
| 2,035,914 | 3/1936 | Olsen | 156—162 XR |
| 2,925,624 | 2/1960 | Stahl et al. | 161—260 XR |
| 1,981,141 | 11/1934 | Caprio | 156—307 |
| 3,157,127 | 11/1964 | Proell | 102—103 |
| 2,549,005 | 4/1951 | Preckel | 102—103 |

PHILIP DIER, *Primary Examiner.*

U.S. Cl. X.R.

102—103; 138—144; 156—162, 187, 307